Sept. 28, 1937.  M. P. BLOMBERG  2,094,442
CONDUIT CONNECTION FOR ARTICULATED CARS
Filed Oct. 18, 1934  2 Sheets-Sheet 1

Inventor
Martin P. Blomberg
By Gilson, ———
attys

Sept. 28, 1937.　　　M. P. BLOMBERG　　　2,094,442
CONDUIT CONNECTION FOR ARTICULATED CARS
Filed Oct. 18, 1934　　　2 Sheets-Sheet 2
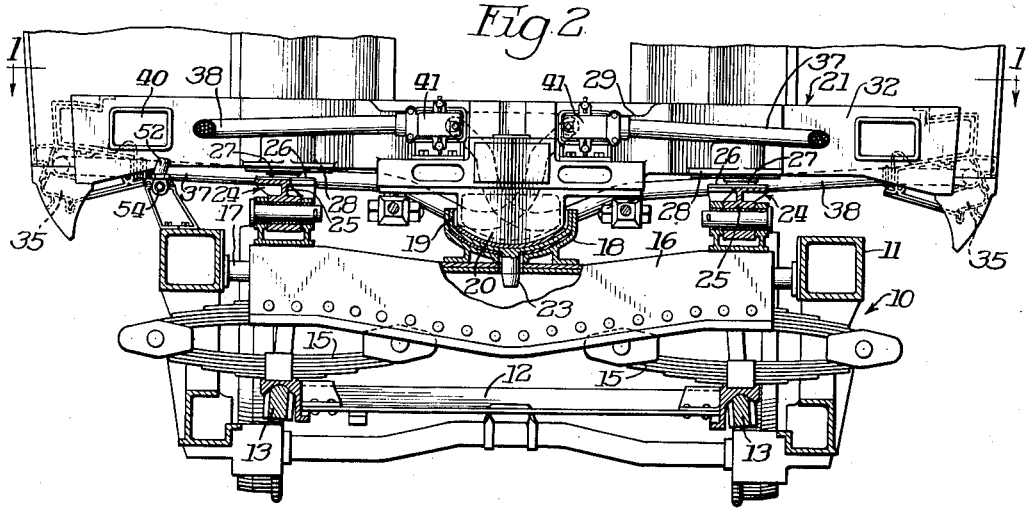
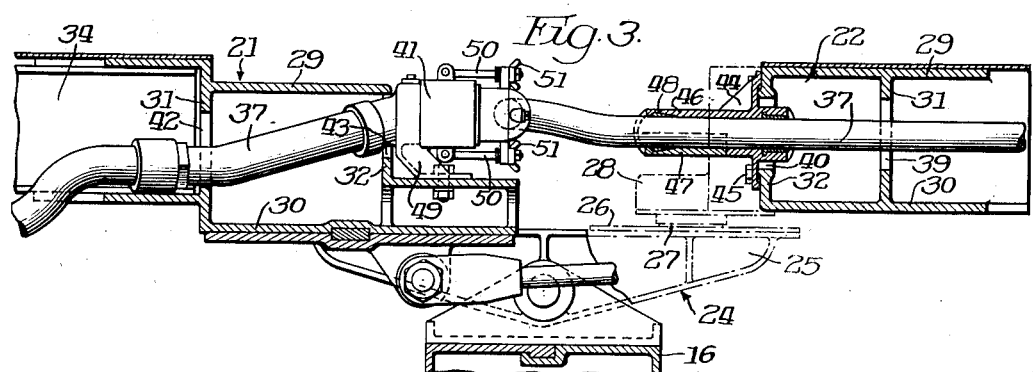
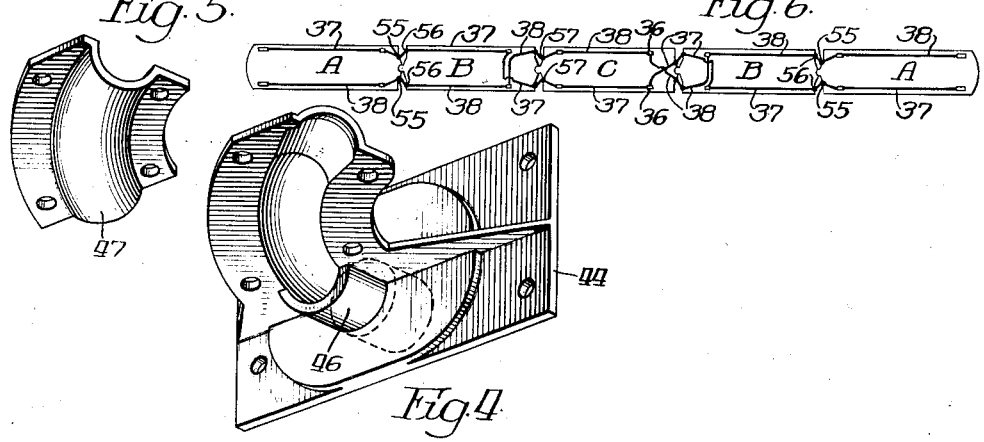
Inventor.
Martin P. Blomberg
By Gilson, ...
attys Patented Sept. 28, 1937

2,094,442

UNITED STATES PATENT OFFICE 2,094,442

CONDUIT CONNECTION FOR ARTICULATED CARS

Martin P. Blomberg, Chicago, Ill., assignor to Pullman-Standard Car Manufacturing Company, Chicago, Ill., a corporation of Delaware Application October 18, 1934, Serial No. 748,878

3 Claims. (Cl. 105—4)

In carrying conduits from one car section to another in articulated cars, it is common practice to have each conduit alined with the corresponding conduit in the adjacent section and connect the two by looped hose, as shown in Figs. 1227-1229 inclusive, of Car Builders Encyclopedia, 1931, page 569. But this type of connection often brings about difficulty due to the fact that the hose is always under strain because of its normally looped position, and consequently may crack. The constant flexing of the hose as the car runs on curved track also tends to shorten its serviceable life.

The present invention has for its principal object to provide an improved connection between conduits of adjacent car sections, and to make it possible to reverse the sections without having to alter the conduit outlets.

Further and other objects and advantages will become apparent as the disclosure proceeds and the description is read in conjunction with the accompanying drawings, in which Fig. 1 is a horizontal sectional view taken partly through the end sill and partly above the end sill of adjacent car sections of an articulated car, the car sections chosen being the B and C sections of a five section articulated car (see Fig. 6);

Fig. 2 is a vertical section taken on the line 2—2 of Fig. 1;

Fig. 3 is a sectional view taken on the line 3—3 of Fig. 1;

Fig. 4 is a bottom perspective view of the bracket attached to the end sill and through which the conduit passes; and Fig. 5 is a bottom perspective view of the plate which clamps the conduit within the bracket.

Fig. 6 is a diagrammatic showing of an articulated car comprising five sections having through conduits arranged so that the three intermediate cars may be turned end for end without having to alter the conduit outlets.

Figure 1:
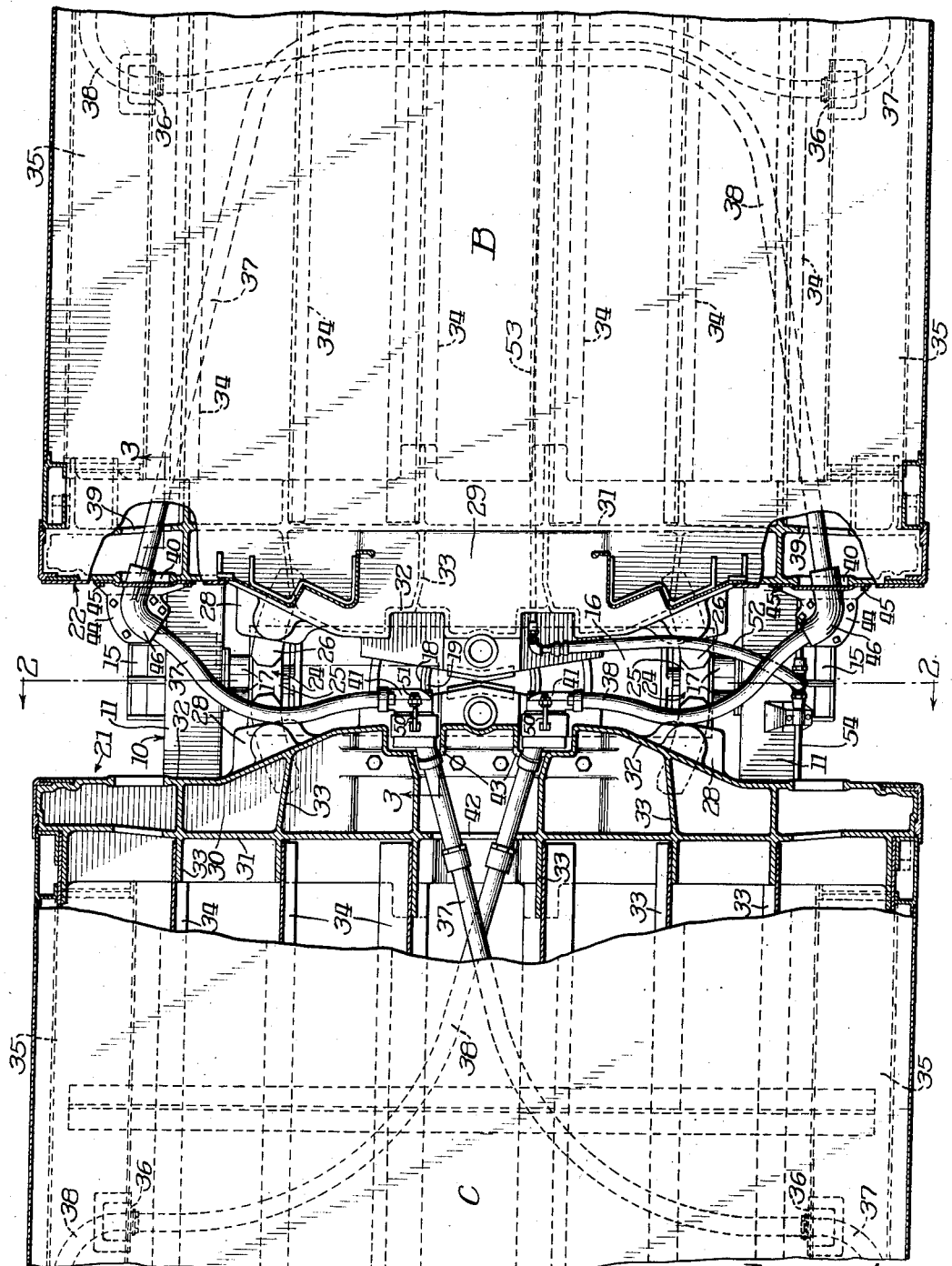

For the purpose of disclosure, the invention has been shown and will be described as an electric cable jumper, but it will be understood that the invention is also applicable to crossovers for air hose, steam lines, signal apparatus and the like. The claims, therefore, should be construed as broadly as the prior art will permit.

In the illustrative embodiment of the invention, the adjacent ends of two car sections C and B are shown articulated on a swing motion truck generally designated 10, consisting of a truck frame 11 from which a spring plank 12 is suspended on swing hangers 13 for carrying elliptical springs 15 which in turn support a truck bolster 16 whose lateral movement is yieldingly resisted by buffers 17. The truck bolster carries a truck center plate 18 of concave form that is adapted to receive body center plates 19 and 20 which are carried by the end sills 21 and 22 of the C and B sections, respectively. The body center plate 20 nests in the other body center plate and the latter has a downwardly extending pin 23 which projects through the truck center plate and holds the parts in their proper relation.

The car bodies are supported in upright position on the articulated joint by side bearings generally designated 24 which may be of any desired form. They are shown in the drawings as comprising equalizer blocks 25 pivotally mounted at opposite ends of the truck bolster 16, and each bar has a smooth flat top surface 26 upon which resiliently backed wear plates 27 are adapted to ride. The end sill castings are provided with outwardly extending lugs 28 for receiving the wear plates.

The end sills 21 and 22 of the adjacent car sections are duplicate castings and each consists of a top web 29, a bottom web 30, a vertical, transverse web 31, a front wall 32 and a plurality of connecting ribs 33 which project inwardly beyond the transverse web 31 and furnish a convenient means for anchoring the longitudinal floor stringers 34 to the end sill.

Along the lower sides of the car sections are cable ducts 35 in which the principal electrical wiring is run and near the ends of the ducts are outlet boxes 36 for permitting the cables to be led to the part of the end sill where they cross over to the adjacent car section. It will be noticed that the cables 37 and 38 cross each other between the outlet boxes and the end sill and the reason for this is that by this arrangement, the B and C sections may be turned end for end without changing the relative position of the crossovers between the car sections, (see Fig. 6).

The cables 37 and 38 of the B section (Fig. 1) pass through openings 39 and 40 near the ends of the end sill and thence turn inwardly where they connect with the corresponding cables of the C section at junction boxes 41 located substantially at the center of articulation between the car sections. The cables 37 and 38 in the C section also cross one another adjacent to the end sill and pass through openings 42 and 43 in the vertical transverse web 31 and the front wall 32, respectively, of the end sill.

The cables in the B section are supported at their point of emergence from the end sill by fittings 44 which are bolted at 45 to the outer wall of the end sill and have a sleeve-like portion 46 which telescopes over the cable and holds it in place. A part 47 of the sleeve is made removable from the remainder to facilitate installation.

The ends of the sleeve-like portion of the fitting are adapted to receive a suitable sealing compound, such as indicated at 48 to prevent water from entering the fitting and to hold the cable firmly in place.

The junction box 41 may be of any desirable form and merely serves to provide a convenient means for breaking and cable connection when the two car sections are separated. The junction box is supported on the end sill by a base 49 and the cable terminal is clamped to the box by swinging studs 50 which receive wing nuts 51.

An important advantage of the cable jumper arrangement above described is that there is little if any flexing of the cable when the car rounds a curve due to the fact that the junction boxes 41 are substantially at the center of articulation. This portion of the cable, therefore, will be capable of enduring more service than cable jumpers which are normally looped and are constantly being flexed.

A further advantage of the arrangement is that the cable jumper lies substantially in a horizontal plane and requires very little clearance. A looped cable jumper if kept at a low level must necessarily be adjacent to the sides of the car section in order to clear the truck.

When the car truck is equipped with its own brake cylinder, the fluid pressure may be conducted to the cylinder through a hose 52 which is arranged so that it likewise lies in a substantially horizontal position and is not subjected to substantial flexing. The brake pipe in the B section is indicated at 53 and it may emerge from near the end sill center and thence be connected by the hose 52 to a pipe 54 carried by the truck frame (see Fig. 2).

In Fig. 6, there is a diagrammatic representation of a five section articulated car having conduit jumpers of the type above described and arranged so that any one or more of the intermediate sections B, B and C may be turned end for end without destroying the relationship between the conduit connections. It will be observed that the A sections have outlets 55 near the center of articulation, the B sections have outlets 56 remote from the center of articulation, and the C section has outlets 57 adjacent to the center of articulation. It will also be noted that the conduits 37 and 38 cross the center line of each of the intermediate car sections. By this arrangement, the B section for example, may be turned end for end and the outlets for the conduits 37 and 38 will still bear appropriate relationship to those of adjacent sections A and C. Likewise, section C may be turned end for end and the conduits will bear appropriate relationship to those of the adjacent B sections.

If desired, the outlets for the A section could be adjacent to the sides of the car, but in such a case, the outlets for the B section would be near the center of articulation, and those for the C section would be remote from the center of articulation.

I claim:—

1. In combination with an articulated car having adjacent car sections pivotally supported on a common bearing, a conduit crossover entering at one end of one of the car sections at a point substantially at the car center line, and entering at the adjacent end of the adjacent car section at a point laterally removed from the said center line.

2. In combination with the adjacent ends of articulated car sections supported on a common truck, each of which sections includes an end sill, a conduit adapted to pass from one car section to the other, said conduit emerging from the end sill of one of the car sections at a point near its center and entering the other end sill at a point near its end, and means for breaking the conduit adjacent to one of said points.

3. In combination with the adjacent ends of articulated car sections supported on a common truck, each of which sections includes an end sill, a conduit adapted to pass from one car section to the other, said conduit emerging from the end sill of one of the car sections at a point near its center and entering the other end sill at a point near its end, and means for forming seals for preventing entrance of water where the conduit passes through the end sills.

MARTIN P. BLOMBERG.

CERTIFICATE OF CORRECTION.

Patent No. 2,094,442.                                          September 28, 1937.

MARTIN P. BLOMBERG.

It is hereby certified that error appears in the printed specification of the above numbered patent requiring correction as follows: Page 2, first column, line 12, for the word "and" read the; and that the said Letters Patent should be read with this correction therein that the same may conform to the record of the case in the Patent Office.

Signed and sealed this 16th day of November, A. D. 1937.

Henry Van Arsdale,
                                              Acting Commissioner of Patents.
(Seal)